US00RE48821E

(19) United States
(12) Reissued Patent
Kuo et al.

(10) Patent Number: US RE48,821 E
(45) Date of Reissued Patent: Nov. 16, 2021

(54) APPARATUS AND METHODS FOR PROTECTING NETWORK RESOURCES

(71) Applicant: PowerCloud Systems, Inc., Palo Alto, CA (US)

(72) Inventors: Ted T. Kuo, Palo Alto, CA (US); Li-Jen Wang, San Jose, CA (US); Bo-chieh Yang, San Jose, CA (US); Simon E. M. Barber, San Francisco, CA (US); Diana K. Smetters, Belmont, CA (US); Jeffrey D. Abramowitz, Menlo Park, CA (US); Andrea Peiro, Redwood City, CA (US)

(73) Assignee: PowerCloud Systems, Inc.

(21) Appl. No.: 14/877,503

(22) Filed: Oct. 7, 2015

Related U.S. Patent Documents

Reissue of:
(64) Patent No.: 8,555,054
Issued: Oct. 8, 2013
Appl. No.: 12/577,684
Filed: Oct. 12, 2009

(51) Int. Cl.
*H04L 29/06* (2006.01)
*G06F 21/57* (2013.01)
(Continued)

(52) U.S. Cl.
CPC ..... *H04L 63/0823* (2013.01); *G06F 21/57* (2013.01); *H04L 9/006* (2013.01); *H04L 9/3263* (2013.01); *H04L 2209/80* (2013.01)

(58) Field of Classification Search
None
See application file for complete search history.

(56) References Cited

U.S. PATENT DOCUMENTS 7,500,100 B1 * 3/2009 Kobozev et al. ..... 713/168
7,904,909 B1 3/2011 Reiner et al.
(Continued)

FOREIGN PATENT DOCUMENTS

CN 1492350 A 4/2004
CN 1964282 A 5/2007
(Continued)

OTHER PUBLICATIONS

U.S. Appl. No. 12/577,674, filed Oct. 12, 2009, Apparatus and Methods for Managing Network Resources.
(Continued)

*Primary Examiner* — Roland G Foster
(74) *Attorney, Agent, or Firm* — Banner & Witcoff, Ltd.

(57) ABSTRACT

Apparatus and methods are provided for protecting network resources, particularly in association with automatic provisioning of new client devices. A global PKI (Public Key Infrastructure) scheme is rooted at a globally available server. Roots of PKIs for individual organizations also reside at this server or another globally available resource. To enable access to an organization's network, one or more authenticators are deployed, which may be co-located with access points or other network components. After a client device enabler (CDE) and an authenticator perform mutual authentication with certificates issued within the global PKI, the CDE is used to provision a new client device for the organization. After the client is provisioned, it and an authenticator use certificates issued within the per-organization PKI to allow the client access to the network.

60 Claims, 4 Drawing Sheets

(51) Int. Cl.
*H04L 9/00* (2006.01)
*H04L 9/32* (2006.01)

(56) References Cited

U.S. PATENT DOCUMENTS

| | | | | |
|---|---|---|---|---|
| 8,954,732 | B1 * | 2/2015 | Watsen | H04L 9/3263 713/157 |
| 9,614,833 | B1 * | 4/2017 | Rao | H04L 63/0823 |
| 2002/0007346 | A1 | 1/2002 | Qiu | |
| 2002/0073310 | A1 * | 6/2002 | Benantar | 713/156 |
| 2004/0243805 | A1 * | 12/2004 | Enokida | 713/175 |
| 2005/0021969 | A1 * | 1/2005 | Williams | H04L 9/3268 713/176 |
| 2005/0069136 | A1 * | 3/2005 | Thornton et al. | H04L 63/0823 380/277 |
| 2005/0086494 | A1 | 4/2005 | Carley | |
| 2005/0144437 | A1 * | 6/2005 | Ransom | G06F 1/28 713/151 |
| 2006/0059333 | A1 | 3/2006 | Gentry | |
| 2006/0159269 | A1 | 7/2006 | Braun et al. | |
| 2006/0236379 | A1 | 10/2006 | Negahdar | |
| 2007/0086449 | A1 | 4/2007 | Huang et al. | |
| 2007/0094367 | A1 | 4/2007 | Esfahany et al. | |
| 2007/0147619 | A1 * | 6/2007 | Bellows et al. | H04L 41/28 380/277 |
| 2007/0198665 | A1 | 8/2007 | De Matteis et al. | |
| 2007/0266136 | A1 | 11/2007 | Esfahany et al. | |
| 2008/0010448 | A1 * | 1/2008 | Sabnis | H04L 9/3263 713/156 |
| 2008/0091952 | A1 * | 4/2008 | Sumner | H04L 63/064 713/185 |
| 2009/0126001 | A1 * | 5/2009 | Krantz | G06F 21/33 726/10 |
| 2009/0222657 | A1 | 9/2009 | Bender | |
| 2011/0087766 | A1 | 4/2011 | Kuo et al. | |

FOREIGN PATENT DOCUMENTS

| | | | |
|---|---|---|---|
| CN | 201010518058.7 | | 10/2010 |
| CN | 2010105059202.2 | | 10/2010 |
| EP | 10186372.8 | | 10/2010 |
| EP | 10186373.6 | | 10/2010 |
| JP | 2002169465 | A | 6/2002 |
| JP | 2002529008 | A | 9/2002 |
| JP | 2004102558 | A | 4/2004 |
| JP | 2005107707 | A | 4/2005 |
| JP | 2006129490 | A | 5/2006 |
| JP | 2007074393 | A | 3/2007 |
| JP | 2008054290 | A | 3/2008 |
| JP | 2008276686 | A | 11/2008 |
| JP | 2009048329 | A | 3/2009 |
| JP | 2010-226314 | | 10/2010 |
| JP | 2010-229523 | | 10/2010 |
| KR | 10-2010-0098123 | | 10/2010 |
| KR | 10-2010-0098124 | | 10/2010 |
| TW | 200718090 | A | 5/2007 |
| TW | 200810488 | A | 2/2008 |
| TW | 99134289 | | 10/2010 |
| TW | 99134290 | | 10/2010 |
| WO | 9410625 | A1 | 5/1994 |
| WO | 2008096825 | A1 | 8/2008 |
| WO | 2009103623 | A3 | 11/2009 |

OTHER PUBLICATIONS

U.S. Appl. No. 12/577,684, filed Oct. 12, 2009, Apparatus and Methods for Protecting Network Resources.
Adams C et al., "Understanding Public-key Cryptography; Concepts, Standards and Deployment Considerations", Macmillan Technical Publishing, excerpt comprising pp. 12-72 and 188-197, 1999.
Apr. 6, 2011—(EP) Search Report—App 10186373.6.
Mar. 13, 2017—(EP) Office Action—App 10186373.6.
Aug. 3, 2011—(EP) Search Report—App 10186372.8.
Apr. 20, 2012—(EP) Office Action—App 10186372.8.
Oct. 2, 2014—(EP) Communication regarding Oral Proceedings—App 10186372.8.
Feb. 3, 2015—(EP) Decision to Refuse—App 10186372.8.
Mar. 6, 2014—(EP) Summons to Oral Proceedings—App 10186372.8.
Jun. 12, 2017—(EP) Summons to Oral Proceedings—App 10186372.8.
Feb. 2, 1998—Nikkei BP No. 263—pp. 108-113.
Oct. 31, 2014—(JP) Search Report—App No. 2010-226314.
Jul. 16, 2018—European Summons to Oral Proceedings—EP 10186373.6.
Raouf Boutaba et al. "Network Managment: State of the Art" in "Communication Systems" Jan. 1, 2002, Boston, MA.
Kidston D. et al. "Distributed Network Management for Coalition Deployments" MILCOM 2000. Oct. 2000. Piscataway, NJ, USA.
Dupay A. et. al. "NETMATE: A Network Management Environment" IEEE Network, IEE Service Center, vol. 5, No. 2, Mar. 1, 1991. New York, NY, USA.

* cited by examiner

APPARATUS AND METHODS FOR PROTECTING NETWORK RESOURCES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

The present application is *a reissue of U.S. Pat. No. 8,555,054, entitled "Apparatus and Methods for Protecting Network Resources," which issued on Oct. 8, 2013 and was filed on Oct. 12, 2009, and is* related to [co-pending U.S. patent application Ser. No. not yet assigned [PARC-20090689]] *U.S. Pat. No. 8,131,850*, entitled "Apparatus and Methods for Managing Network Resources", which *issued on Mar. 6, 2012 and* was filed Oct. 12, 2009[and is], *both of which are* incorporated herein by reference.

BACKGROUND

This invention relates to the fields of computer systems and data security. More particularly, apparatus and methods are provided for protecting network resources from unauthorized access, while allowing a new client device access to the network resources.

The level of knowledge needed to effectively configure and operate networked computer systems can be quite high. Large organizations typically maintain a relatively large IT (Information Technology) staff to configure new equipment, maintain existing equipment, assist users with operation of their equipment, apply security policies, monitor network security, etc. However, some organizations, particularly those that are smaller, cannot afford sufficient experienced full-time IT staff for performing the same functions, and whoever may be tasked with IT responsibilities within such an organization may be unprepared for the myriad problems that may arise.

For example, securing an organization's network resources from unauthorized access is a critical task that can easily be performed in an incomplete or ineffective manner. Due to the complexity of the problem, the lack of effectiveness may not be apparent to the organization until the network has been breached. The amount of data stored electronically is prodigious and grows daily, and makes network security all the more important.

One reason it can be difficult to adequately secure network resources is the tension between the need to permit legitimate use of the resources without unreasonable difficulty, and the desire to prevent all illegitimate use. This tension increases as the number and type of resources deployed increases.

Each new type of resource may be configured in a different way to access permitted resources, apply a desired level of security, etc. Securing an organization's network resources is just one of many tasks and, without adequate IT staffing, this task may receive short shrift in the face of users' demands for real-time assistance. Thus, configuring and monitor network security must compete with tasks such as helping users configure their equipment for use within the organization.

Some organizations choose to use automated provisioning to prepare new devices for use within their network. However, if an organization's security policies do not encompass the automated provisioning equipment and utilities, and cooperate with the configuration of a new device's security profile, security vulnerabilities may be introduced into an organization along with the new device. Or, if the provisioning is performed in a haphazard or hurried manner, security policies may not be applied correctly or completely.

In short, installation or configuration of a new network device is too often performed without proper application of appropriate security policies, especially if the organization does not have sufficient full-time and well-trained IT personnel.

SUMMARY

In some embodiments of the invention, apparatus and methods are provided for protecting an organization's network resources, particularly in association with automatic provisioning of new client devices within the organization. Securing the resources from unauthorized access, while fully supporting access to all authorized personnel, is based in the use of two cooperating PKI (Public Key Infrastructure) schemes that enable certificate-based authentication of all entities attempting to use the resources.

A first, global, PKI scheme is rooted at a globally available authentication server (e.g., a server that is accessible via the Internet). Network devices, authenticators, which are used to validate clients and grant access to an organization's network, and client device enablers (CDEs), which are used to provision new client devices, are issued certificates within the global PKI. This is done to enable network devices, client devices, and authenticators to be provisioned prior to knowing what organization they will be used by if desirable for operational reasons.

Identities of network devices, authenticators and CDEs bound to a particular organization (e.g., by serial numbers, client certificates) are recorded and shared among the organization's authenticators to help limit network access to authorized personnel and devices. An authenticator may be a stand-alone network component or may be co-located with an access point (e.g., a wireless access point), a switch or other communication equipment.

A second, per-organization, PKI scheme is also rooted at the authentication server or other resource with high availability. A separate root CA (Certificate Authority) is maintained for each organization. An organization's authenticators are issued organization sub-root (intermediate) CA certificates, which allow them to issue client certificates to new client devices, within the organization's PKI. This enables the authenticators to issue new certificates even if the root CA is temporarily unavailable or offline.

To provision a new client device for a particular organization, a CDE bound to that organization mutually authenticates with one of the organization's authenticators, using certificates issued under the global PKI. After successful authentication, the CDE requests and the authenticator issues a new organization client certificate to the client device, within the organizational PKI.

After a client device is provisioned, it uses the organization certificate to authenticate itself to an authenticator and access the organization's network. In some embodiments, the client's certificate (or a fingerprint thereof) is added to a whitelist shared among the organization's authenticators. This whitelist may be shared with the global administration server if and when it is reachable, or may be shared via local means.

The identities (e.g., certificates, certificate fingerprints, other identifiers) of the organization's authenticators and CDEs may also be disseminated as whitelists. This whitelist may be disseminated via the global administration server if and when it is available, or via other local means. A component or device that is lost, stolen or otherwise missing is removed from its whitelist and/or placed in a blacklist in order to prevent it from being used.

In some embodiments, after a new client is provisioned, the provisioning authenticator's intermediate CA certificate (within the organization PKI) and the provisioning CDE's client certificate (within the global PKI) are replaced or updated after use, if or when a connection to the global root CA is available. For example, a counter or other distinguishing data field may be altered in the new certificate. By regularly updating these certificates, corrective action can be easily applied if an authenticator or CDE is lost, stolen or compromised (i.e. the appropriate certificates are removed from the whitelists and added to a blacklist). By rolling over the CDE client certificate and authenticator intermediate CA certificates whenever possible after use the number of client certificates issued under each one is minimized, and so the impact of revoking or blacklisting them is minimized. In addition duplication of a CDE is more rapidly detected.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, apparatus and methods are provided for protecting an organization's network resources from unauthorized access, without requiring substantial expertise and effort on the part of the organization. In these embodiments, individual devices (e.g., new client devices) join the security scheme when they are provisioned for operation within the network.

Multiple PKIs (Public Key Infrastructures) are employed to authenticate network devices and allow operation of the network, but the organization need not maintain a server dedicated to PKI management and operation. Instead, a cloud-based authentication server supervises the infrastructures, which can continue to function even if the server is unavailable. Under the rubric of the PKIs, certificates are issued and components must pass a certificate-based authentication scheme before accessing an organization's network.

More specifically, a global PKI scheme distributes certificates to an organization's client device enablers (CDEs), which operate to provision the organization's new client computing devices, and to the organization's authenticators (e.g., wireless access points, switches), which mutually authenticate with CDEs and client devices before they can access the organization's network. Thus, authentication between a CDE and an authenticator is performed using global PKI certificates, and is done for the purpose of authenticating a new client. This allows CDEs to be provisioned prior to knowing which organization they will be used by if so desired for operational reasons. A table is maintained in the global administration server tracking the ownership of any CDE.

A per-organization PKI scheme distributes intermediate CA (Certificate Authority) certificates and server certificates to the organization's authenticators, and may distribute client certificates to the organizations clients. Regular use of the organization's network thus requires mutual authentication with the organization certificates. (A network device may be issued with multiple organization certificates for different purposes—e.g. an intermediate CA cert to allow it to issue client certificates and also a server cert to allow it to mutually authenticate the network with clients).

Figure 1:
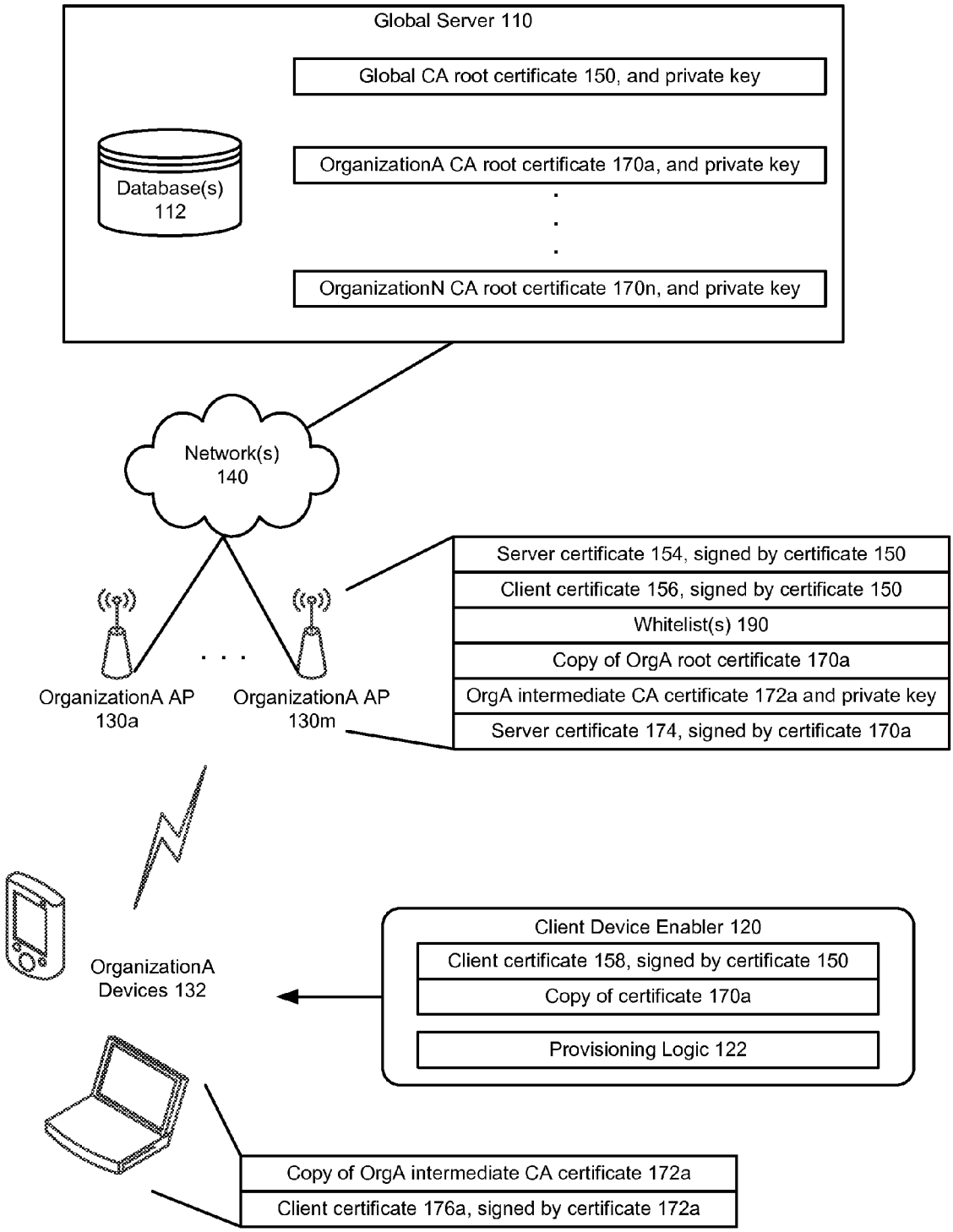
FIG. 1 is a block diagram depicting a computing environment in which some embodiments of the invention may be implemented.

FIG. 1 is a diagram of a computing environment in which some embodiments of the invention may be implemented.

In these embodiments, global server 110 manages PKIs for one or more organizations, and is accessible via networks 140, which may include the Internet, organizational intranets and/or other public and/or private networks. As will be discussed below, organizations' networks and network resources are protected and fully accessible to authorized users even when the global server is unavailable (e.g., because of an outage of a network 140).

Global server 110 may be referred to as an authentication server, because it serves as the root of one or more PKIs. In other embodiments, functions of server 110 (e.g., authentication, PKI management, device registration) may be divided among multiple entities.

Coupled to global server 110 by network(s) 140 are organizations' access points (AP) and/or other communication equipment and network devices. For example, wireless access points (WAP) 130a-130m operate on behalf of an individual organization (i.e., OrganizationA) to provide network access and communication between resources. The organization's resources also include any number and type of client devices 132, such as laptop and notebook computers, personal digital assistants (PDAs), netbooks, desktop computers, workstations, etc.

Access points 130 may be referred to as authenticators, because they participate in mutual authentication schemes to limit access to network resources to authorized entities.

Access points 130 are merely illustrative forms of authenticators that may be employed by an organization to provide and protect access to network resources. Other types of equipment that may act as authenticators to protect access to network resources include switches, routers, VPN gateways, etc.

Client device enabler (CDE) 120 is configured to help provision a new client device for operation within the organization, by executing provisioning logic 122. In some embodiments of the invention, CDE 120 comprises a USB (Universal Serial Bus) device, compact disc or other removable storage media. In other embodiments, CDE 120 comprises a collection of logic that may be delivered to a device via network download, electronic mail, instant message or other means.

When a new device is to be configured, the CDE is coupled to or installed on the device. The provisioning logic then executes to configure the device for operation within the organization's network, which may involve installing one or more digital certificates.

In some embodiments of the invention, a client device enabler may be used multiple times, to provision multiple client devices. Each time it is to be used, it must mutually authenticate itself with one of the organization's authenticators. The authenticator will not only authenticate a digital certificate supplied by the CDE, but will also check the CDE's identity (e.g., a serial number in its certificate) against a list of CDEs approved for use within the organization (e.g., a whitelist). This authentication and verification may also be performed by simply checking a fingerprint of the CDE's certificate against a list of acceptable fingerprints (which has been distributed to all the organization's authenticators by the global administration server or other local means).

Some client device enablers may be limited to a maximum number of uses (e.g., 1, 5, 10). When such a CDE is used to provision a client, a counter may be incremented in a central database (e.g., on global server 110) and/or a list shared among the organization's APs 130. After the CDE has been used for the approved number of times, it is removed from the database and/or acceptable list so that it will not be accepted as a valid CDE in the future.

In some embodiments of the invention, access points within an organization's network may support two modes of operation. One mode provides full use of network resources to authorized, authenticated devices. This mode is available to client devices that have been provisioned and configured with a client digital certificate issued within the organization's PKI.

A second mode allows limited use of some network resources. In this second mode of operation, a "guest" client (e.g., a new client device that has not yet been provisioned) is able to establish sufficient access to receive a software-based CDE, possibly via electronic mail, network download or other transmission. After the CDE is downloaded and executed to provision the client device, the device will be able to operate under the first mode of operation for full network access.

For purposes of securing networks and network resources, global server 110 comprises database(s) 112 and various PKI certificates. Database(s) 112 store(s) identities of devices and equipment authorized to participate in an organization's network. For example, as new network resources such as access points and client device enablers are authorized for use in an organization's network, their identities are associated with the organization and are stored in the database(s).

Among the PKI certificates stored by the global server are global CA (Certificate Authority) root certificate 150 and, for each organization served by the global server, a CA root certificate 170 unique to that organization. For example, for organizations A-N, the global server stores the organization's CA root certificate 170a-170n.

Thus, multiple PKIs are anchored at the global server. The global PKI, rooted at CA root certificate 150, provides an overall framework of digital certificates for implementing a global security scheme that prevents unauthorized devices from using network resources while allowing a CDE and an authenticator to provision a new client device within an organization. This may be termed a "global" PKI.

Additional PKIs, one for each organization, are rooted at their respective CA root certificates and are used to build a framework of digital certificates for use within the corresponding organization. The per-organization certificates are used post-provisioning to adjudicate regular access to the organization's network. These PKIs may be termed "organization" PKIs.

For each root certificate it maintains, the global server also possesses the corresponding private key. This allows the server to issue new certificates for equipment and devices. It may be noted that by managing the global PKI and organization PKIs at the global server, individual organizations need not dedicate efforts and resources to managing their PKI.

An organization's authenticators (e.g., wireless access point 130m of organizationA) also store various digital certificates. These certificates may include a server certificate 154, signed by global root certificate 150, for authenticating itself to a client device enabler when the CDE attempts to provision a new client device. AP 130m further includes a global client certificate 156, also signed by global root certificate 150, with which to authenticate itself to global server 110.

As for organizationA's PKI, AP 130m includes a copy of the organization's root certificate 170a (incorporating the corresponding public key). These allow the AP to authenticate a client. If a whitelist for clients is in use then the AP will also contain either a list of acceptable client certificates or a list of fingerprints of acceptable client certificates). This list is updated by the global administration server whenever connectivity is available.

AP 130m also includes a intermediate CA certificate for organizationA (certificate 172a), which is signed by and is subordinate to organization CA root certificate 170a. This allows the AP to issue client digital certificates within the organization PKI without involving the global server (and so enables new clients to be enabled when the server is offline). Finally, the AP also has server certificate 174, signed by root certificate 170a, which allows the AP to authenticate itself to client devices.

In the embodiments of the invention depicted in FIG. 1, client device enabler (CDE) 120, possesses global client certificate 158 (signed by global root certificate 150), for authenticating itself to an access point when the CDE operates to provision a new client device. As for the organization PKI, CDE 120 has a copy of root certificate 170a and the corresponding public key, with which it can authenticate an organization access point 130.

Access point 130m and/or CDE 120 also store copies of global CA root certificate 150.

In embodiments of the invention reflected in FIG. 1, individual clients 132 possess only certificates issued within the organization's PKI. In particular, a client has a copy of organizationA's root CA certificate 170a, so that it can authenticate an AP when connecting to the organization's network. The client also possesses a client certificate 176a, which is signed by intermediate CA certificate 172a (and, by extension, by root certificate 170a) and the issuing authenticator's intermediate CA certificate 172a; these certificates allow the device to authenticate itself to the AP.

This configuration of certificates on an organization's client device 132 is assembled when the device is provisioned by a client device enabler. Before provisioning, the client device may have no organization certificates and may be unable to access the organization network (except possibly in a limited "guest" mode).

However, in other embodiments of the invention, a client device may be received by an organization already equipped with a global client certificate signed by global CA root certificate 150. This certificate may be used to enable initial authentication with an authenticator, after which it may be provisioned using software that is already installed on the client, or that is downloaded from the authenticator or other network location.

Thus, in embodiments of the invention described herein, the global PKI is used to enable trusted communications between client device enablers and an organization's authenticators (e.g., access points), in order to allow secure provisioning of a new client device. The global PKI also allows the authenticators and the global server to mutually authenticate themselves to each other.

An organization's PKI is used to authorize use of the organization's network resources. Thus, after a CDE is permitted to provision a new client device, the client is configured to use a certificate issued within the organization PKI to authenticate itself to an access point.

In some embodiments of the invention, an organization's authenticators share one or more whitelists 190 and/or blacklists to help determine which entities can and cannot access the organization's network.

For example, after a new client is provisioned and accepted into the network, its client certificate and/or other identity are added to a client whitelist. Once the whitelist is distributed to all authenticators, they can authenticate that client directly (i.e., without validating it through its certificate chain).

Illustratively, the client whitelist may comprise fingerprints (e.g., hashes) of approved client's certificates and, when a client submits its certificate for authentication, an authenticator may simply generate a comparison fingerprint from the submitted certificate and compare it to the one in the whitelist to verify the client's identity and authorization.

For the period of time between provisioning of a new client and distribution of an updated whitelist, an authenticator can authenticate the client in the normal fashion—through its certificate chain. If a client is deemed to be invalid, its certificate can simply be removed from the whitelist and/or added to a blacklist to prevent it from accessing the network.

Another whitelist that may be shared among an organization's authenticators is a list of the authenticators' organization intermediate CA certificates (or fingerprints thereof). This helps an individual authenticator validate an organization client certificate issued to a new client device by another authenticator before the client's certificate is added to the client whitelist.

Yet another whitelist that may be shared comprises global client certificates (or fingerprints thereof) of valid client device enablers. When a CDE becomes invalid, such as after provisioning a predetermined number of clients, or is lost/stolen, it can be removed from the CDE whitelist, which will prevent an authenticator from recognizing the CDE and allowing it to provision another device.

In some embodiments of the invention, a separate CDE management server (or CMS) may be implemented to register an organization's CDEs. The CMS may be located within the organization's network or external to the network (e.g., with global server 110 of FIG. 1). Each CDE bound to the organization may have to be registered at the CMS, and/or the CMS may be configured to generate or issue new CDEs—such as by downloading or emailing the CDE logic, or by storing the software on a USB drive, compact disc or other portable storage device.

Figure 2:
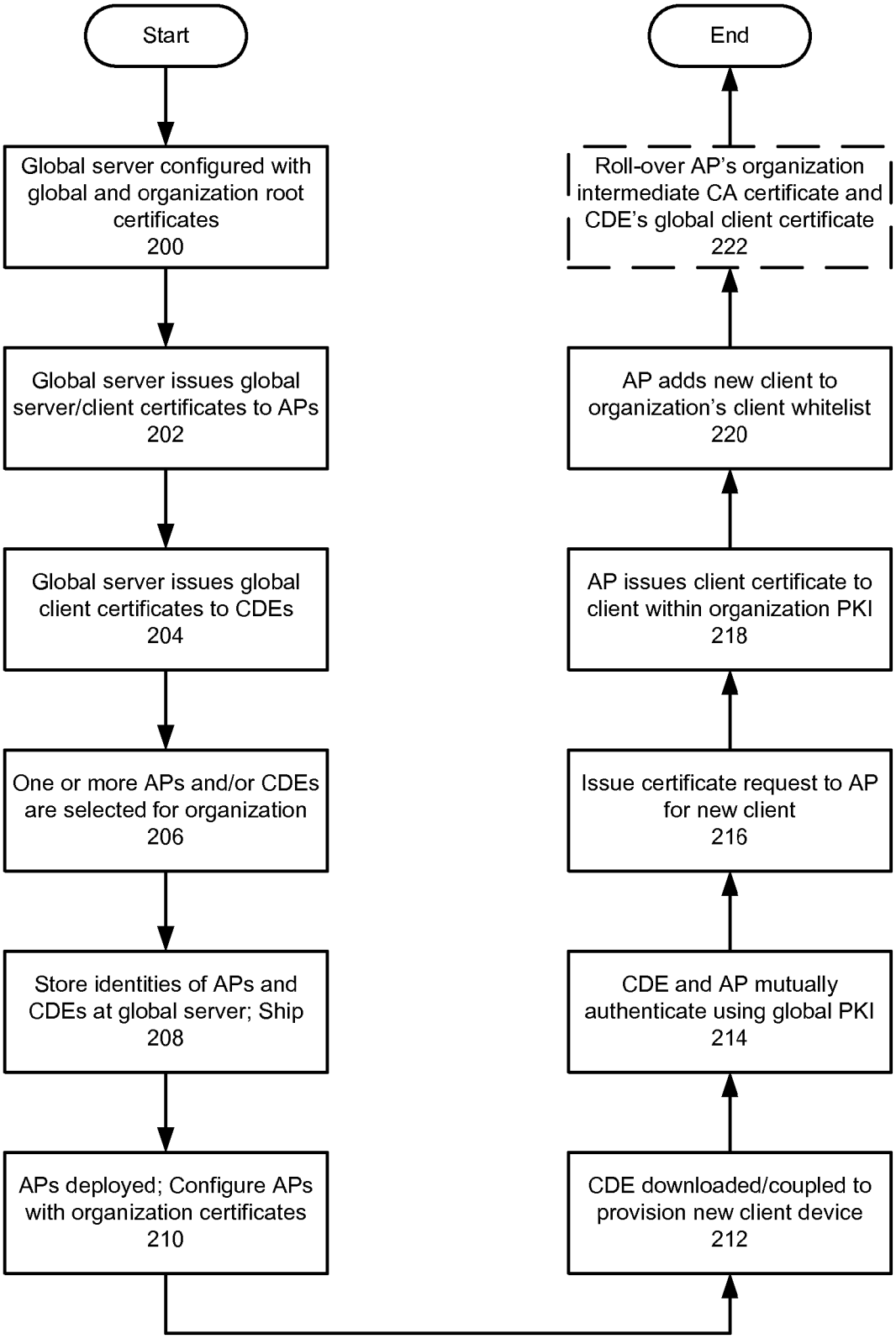
FIG. 2 is a flow chart demonstrating a method of provisioning a new client device while protecting network resources from unauthorized access, according to some embodiments of the invention.

FIG. 2 is a flow chart demonstrating a method of provisioning a new client device while protecting network resources from unauthorized access, according to some embodiments of the invention.

In these embodiments, EAP-TLS (Extensible Authentication Protocol—Transport Layer Security) is employed to provide a secure certificate-based scheme for mutual authentication between network entities. The TLS portion of the EAP-TLS security scheme is not used to encrypt a client's data connection within an organization's network, but rather to authenticate the client and the network and allowing secure exchange of other encryption keys that will be used to encrypt the client's data connection.

EAP-TLS provides or supports the "organization" PKI described above; the "global" PKI is maintained outside the EAP-TLS scheme. Although the method described in conjunction with FIG. 2 uses a single organization PKI, one skilled in the art will appreciate how use of dual PKIs, as provided for in the EAP-TLS specification, may be applied without exceeding the scope of the present invention.

In operation 200, a global authentication server is configured with a CA root certificate of a global PKI. The global server will also be populated with CA root certificates of individual organizations' PKIs as the organizations choose to have their networks protected as described herein.

Advantageously, the authentication server is managed by a security facilitator or other entity that can be dedicated to protection of organizations' networks and resources. This obviates the organizations from having to maintain constant awareness of their security posture, manage the issuance and rescission of digital certificates, configure CDEs, etc.

In operation 202, the authentication server issues appropriate digital certificates to selected authenticator devices (e.g., wireless access points, switches) within the global PKI. For example, an authenticator may be issued a client global certificate for purposes of authenticating itself to the global server, and a server global certificate to allow it to authenticate itself to other equipment, such as client device enablers that operate to provision client devices.

One example of an authenticator—an access point (AP)—is used to describe operation of the method of the invention presented in FIG. 2. Other embodiments of the invention may employ other types of authenticators.

In operation 204, the authentication server issues appropriate digital certificates to client device enablers. Specifically, in these embodiments, the CDEs are issued client global certificates, with which they will be able to authenticate themselves to deployed access points. In some embodiments, the access points and/or the CDEs may also be populated with copies of the authentication server's global root certificate and corresponding public key.

It may be noted that the access points and client device enablers that receive global digital certificates in operations 202-204 are not yet in use, are not yet associated with an organization, and are not yet issued any organization digital certificates. However, because they have appropriate global certificates, they can be deployed as needed (e.g., when requested by an organization), authenticate themselves within the global PKI, and then receive the necessary organization certificates, as described shortly.

In operation 206, one or more APs and CDEs are selected for deployment to and within an organization. For example, the entity that operates the global authentication server may maintain this equipment until needed by an organization. When the organization orders the equipment, the APs and CDEs can be sent immediately, even before receiving any certificates issued through the organization PKI.

In these embodiments of the invention, a CDE is an article comprising both hardware and software—such as a USB thumb drive that stores the necessary provisioning logic and data. In other embodiments of the invention, however, a CDE comprises software that can be readily copied, emailed, downloaded or otherwise transmitted between network entities.

In some embodiments of the invention, one or more CDEs are shipped with each access point. Thus, in these embodiments of the invention, an organization receives all the equipment necessary to get one or more client devices up and running within the organization's network. The global administration server stores mapping of which CDEs shipped with which Aps, so when an AP is registered to a particular organization the CDEs that shipped with it are also automatically registered to that organization.

In operation 208, identities of the selected APs and CDEs are stored at the global server and bound to the organization. For example, their serial numbers, IP (Internet Protocol) addresses, MAC (Medium Access Control) addresses or other identifying indicia are stored.

Later, when the equipment connects to the server (e.g., after being connected to the organization's network for the first time), the global server can verify that the equipment has been associated with and connected to the correct organization, that the equipment was not surreptitiously switched for a different item, etc.

Yet further, in operation 208 a CDE whitelist for the organization may be initialized with the client global certificates of the selected CDE, or fingerprints thereof, and an AP whitelist may be initialized with certificates (or certificate fingerprints) of the APs. These whitelists (or data with which to assemble the lists) may be managed at the authentication server. Also in operation 208, the APs and CDEs are shipped or delivered to the organization.

In operation 210, the organization receives and deploys the selected access point(s). Upon connection to the organization's network, a newly deployed AP will attempt to contact the global server. Upon connection, the two entities will mutually authenticate themselves using their global certificates. The AP may receive copies of any relevant whitelists (or updates thereto) while connected to the global authentication server.

Then, the global server issues the AP a set of organization certificates that are used to specifically protect the organization's network resources. Except possibly for CDEs acting to provision new client devices, only equipment having certificates issued within the organization PKI will be able to fully use the organization's network.

In these embodiments of the invention, the AP receives a copy of the organization's CA root certificate (and corresponding public key), a new intermediate CA certificate issued in a name of the AP (with which it will issue organization client certificates to client devices), and an organization server certificate with which it will authenticate itself to client devices attempting to access the organization network.

In operation 212, a CDE is plugged into a client device that is to be provisioned for network access or, in the case of a software-only CDE, is loaded onto the device. In these embodiments, client devices comprise primarily portable computing devices, but may also or instead include stationary (e.g., desktop, workstation) computers. Before the CDE is connected, the client device is physically configured as necessary (e.g., with a wireless network card, one or more USB ports, data storage devices).

As part of its provisioning of the client, the CDE may configure the client device in any way necessary to enable it to function securely within the organization network. For example, it may load network drivers, configure a network connection, set security parameters, install anti-virus or other protective software, etc. The provisioning process may be considered to be complete when the new client device can communicate with an access point, or the provisioning may be considered to continue through additional operations (e.g., operations 214 through 218 or 220), until the client device is configured to fully participate within the organization network.

In operation 214, via the client device, the CDE makes a connection with one of the organization's access points, and the CDE and the AP mutually authenticate themselves. In these embodiments of the invention, the authentication is performed using their digital certificates issued within the global PKI (e.g., a server certificate for the AP and a client certificate for the CDE). Mutual authentication allows the CDE and AP to open an encrypted TLS communication session.

In operation 216, the CDE runs a standard key management protocol, within the TLS session, to request an organization client digital certificate for the client from the AP.

In operation 218, the AP generates and signs a client certificate for the client (using its organization intermediate CA certificate), and transmits it to the client, along with a copy of the organization root certificate and corresponding public key. The new client certificate thus has a chain of signatures including the AP (its organization intermediate CA certificate) and the authentication server (acting as the organization CA root certificate).

In operation 220, the AP adds the client to the organization's client whitelist. In some embodiments, this is done by opening a secure communication session with the global authentication server (e.g., using the global PKI) and adding the client's new certificate (or a fingerprint thereof) to a database or central copy of the whitelist; the whitelist may also include some identity (e.g., serial number, network address) of the new client.

The updated whitelist is then distributed among the organization's APs. Such updates may be distributed every time the whitelist is modified, or at regular intervals (e.g., 10 minutes, 1 hour).

It may be noted that the new client device can be provisioned and provided with a valid organization client digital certificate even while the AP is unable to communicate with the global authentication server. Thus, even without network connectivity outside the organization, new organization client devices can be configured and put into operation.

However, until the new client's certificate is disseminated to all APs, if the client connects to the organization network via an AP other than the one that issued its certificate, that certificate may need to be fully authenticated by the other AP. Once the updated whitelist is distributed, the other AP may only need to generate a fingerprint of the client's certificate (received during the authentication process) and compare it to the fingerprint stored in the whitelist.

Therefore, after operation 220, the new client device is able to open secure communication sessions with organization access points, mutually authenticate using its new organization client certificate, and access the organization's network.

In optional operation 222, digital certificates for one or more entities may be updated or rolled-over. For example, in some embodiments of the invention, each time an AP signs a new organization client digital certificate, it will contact the global authentication server to request a new/updated organization Intermediate CA certificate. The updated/replacement certificate may comprise an updated counter, a new timestamp or some other data value that allows the certificate to be differentiated from other organization Intermediate CA certificates issued to the AP. Illustratively, this may be done in parallel or as part of updating one or more whitelists.

In these embodiments of the invention, updating the AP's organization intermediate CA certificate on a regular basis (e.g., after every new client is provisioned) means that if the AP is lost, stolen or otherwise unaccounted for, any client certificates it issues after disappearing can be easily identified. Thus, if an AP is lost, it will be removed from the organization's AP whitelist (and/or placed in a blacklist), and any client certificates later generated by the AP and presented to a valid organization AP will be recognized as being invalid.

Similarly, a CDE's global client certificate may be updated, rolled-over or replaced each time it is used to provision a client device. As described previously, in some embodiments of the invention a CDE may only be valid for a limited number of uses. After that number of uses (which may be tracked at the global server and/or elsewhere), it may not receive a new certificate, and it may be removed from the organization's CDE whitelist (and/or placed in a blacklist).

By regularly updating or replacing the CDE's global client certificate, the CDE can be disabled if it is lost or stolen. In particular, when a CDE is determined to be missing, it is removed from the organization's CDE whitelist (and/or placed in a blacklist), so that no organization APs will allow the CDE to provision a new client (i.e., will not issue a new organization client certificate in response to a request from the CDE). In addition, because of the updates to the CDE's certificate, any clients that may have been provisioned after the CDE was compromised can be identified and isolated.

Because the global authentication server may be unreachable at some times (e.g., when the organization's connection to the Internet is interrupted), updates to digital certificates for APs, CDEs and/or other equipment may be postponed until the server is available. Illustratively, the affected component (e.g., an AP, a CDE) may continue to be used normally in the meantime.

Also, in some embodiments of the invention, an AP may distribute new client certificates (or fingerprints thereof) directly to other organization APs (e.g., if the global server is unreachable).

In some embodiments of the invention, a client device enabler's credentials must be approved by the global authentication server before it can be used to provision a client device, and they are updated or rolled-over at that time. In these embodiments, the CDE first authenticates itself to an authenticator, wherein a fingerprint generated from the certificate presented by the CDE is compared to a whitelist fingerprint. If the CDE passes this step, its credentials are passed to the authentication server.

The authentication server searches its CDE records for this CDE, validates and updates the CDE's credentials, signs them, updates its organization CDE records, and returns the updated credentials to the authenticator for return to the CDE. The authentication server also distributes the updated fingerprint to all organization APs.

Figure 3:
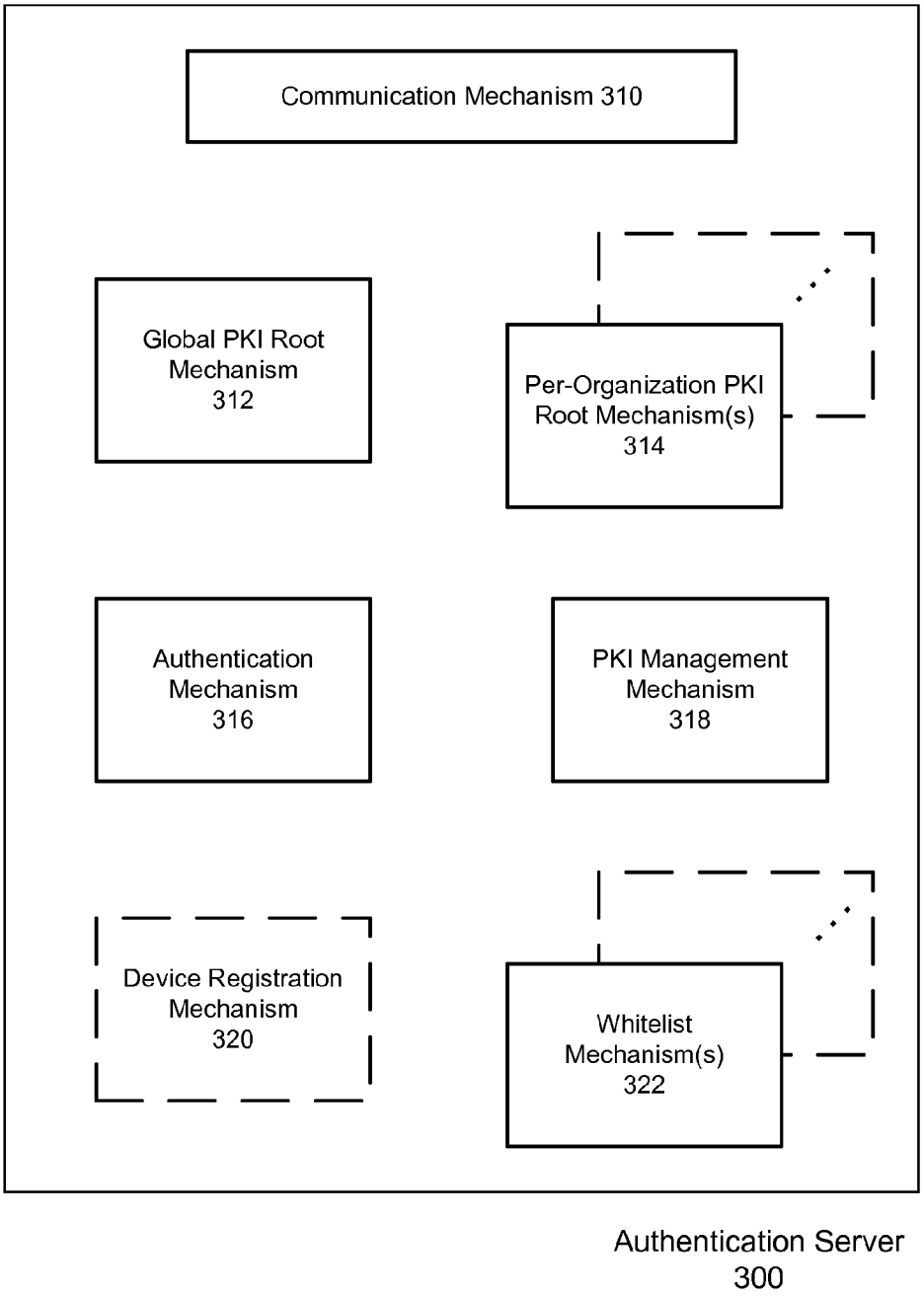
FIG. 3 is a block diagram of hardware apparatus for protecting access to an organization's network resources, according to some embodiments of the invention.

FIG. 3 is a block diagram of apparatus for protecting access to an organization's network resources, according to some embodiments of the invention.

Global administration server 300 comprises communication mechanism 310, global PKI root mechanism 312, per-organization PKI root mechanism(s) 314, authentication mechanism 316, PKI management mechanism 318, optional device registration mechanism 320 and whitelist mechanism(s) 322. Any or all of these mechanisms may be combined or subdivided in other embodiments of the invention.

Communication mechanism 310 is adapted to exchange communications with an organization's authenticators (e.g., access points, switches). The communication mechanism may be associated with a user interface that can be manipulated by an operator of the authentication server to facilitate configuration and/or operation of the server. The communications are protected by mutual authentication and encryption, such as TLS or HTTPS.

Global PKI root mechanism 312 is adapted to act as a root CA (Certificate Authority) for a global PKI through which client device enablers (CDEs) and authenticators can mutually authenticate themselves prior to provisioning a new client device.

Per-organization PKI root mechanism(s) 314 are adapted to act as root CAs for individual organizations. Each mechanism 314 serves as the root for issuing organization digital certificates to devices and equipment that will operate within the corresponding organization's network.

Authentication mechanism 316 is adapted to authenticate an authenticator, CDE or other external device attempting to open a secure communication session with authentication server 300. Depending on the nature or purpose of the session, a digital certificate proffered by an authenticator or other entity may be authenticated using either global PKI root mechanism 312 or a per-organization PKI root mechanism 314.

PKI management mechanism 318 is adapted to manage PKI root mechanism 312 and/or mechanism(s) 314. For example, the PKI management mechanism may facilitate issuance of updated or replacement digital certificates (e.g., an authenticator's organization intermediate CA certificate, a CDE's global client certificate), possibly with cooperation of the corresponding PKI root mechanism.

Optional device registration mechanism 320 is adapted to register one or more types of devices or equipment for operation within the global PKI and/or a per-organization PKI. For example, device registration mechanism 320 may register CDEs and/or authenticators for use within an organization, or such registration may be performed by another entity. Illustratively, if CDEs are registered at authentication server 300, the server may also be configured to download software-based CDEs to authenticators and/or client devices.

Whitelist mechanism(s) 322 are adapted to identify devices or equipment authorized to operate within an organization's network. Thus, for a given organization, one or more whitelists may be maintained for identifying valid authenticators, CDEs and/or client devices. These components may be identified by digital certificates (or fingerprints or other artifacts thereof), serial number or other indicia. Whitelist mechanism(s) 322 may comprise one or more distinct whitelists, for distribution among an organization's network resources, or may comprise a collection of data (e.g., databases, tables) from which such whitelists may be generated.

In some embodiments of the invention, one or more blacklist mechanism(s) may also be operated to identify authenticators, CDEs and/or other entities specifically prohibited from operating within one or more organizations' networks.

Figure 4:
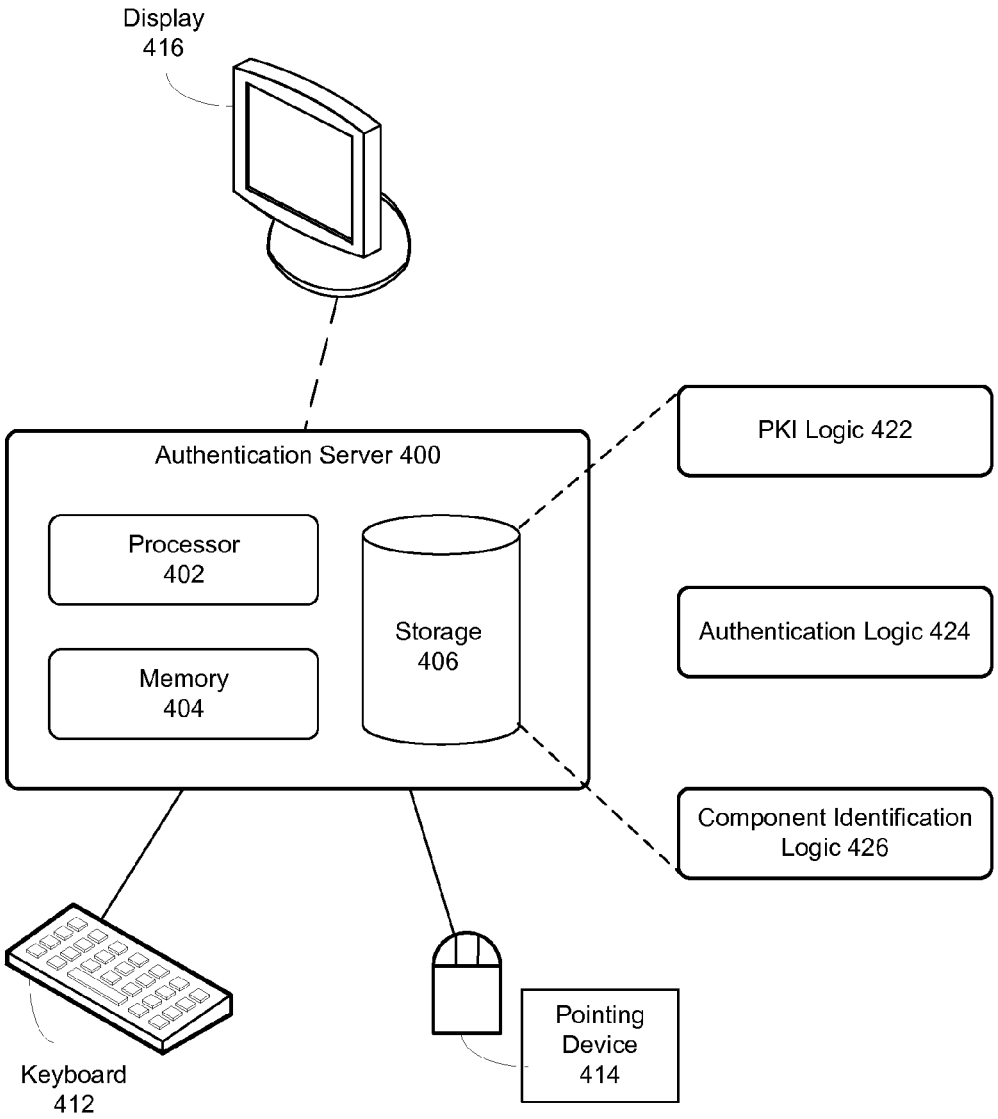
FIG. 4 is a block diagram of an authentication server, according to some embodiments of the invention.

FIG. 4 is a block diagram of an authentication server, according to some embodiments of the invention.

Authentication server 400 of FIG. 4 comprises processor 402, memory 404 and storage 406, which may comprise one or more optical and/or magnetic storage components. Authentication server 400 may be coupled (permanently or transiently) to keyboard 412, pointing device 414 and display 416.

Storage 406 of the authentication server stores logic that may be loaded into memory 404 for execution by processor 402. Such logic includes PKI logic 422, authentication logic 424 and component identification logic 426.

PKI logic 422 comprises processor-executable instructions for operating one or more public key infrastructures, including issuing certificates, replacing certificates, creating new PKIs, etc.

Authentication logic 424 comprises processor-executable instructions for authenticating a digital certificate presented to authentication server 400.

Component identification logic 426 comprises processor-executable instructions for identifying valid organization components (e.g., authenticators, clients, client device enablers) to those components' peers. Such information may illustratively be disseminated in the form of whitelists and/or blacklists.

In other embodiments of the invention, an authentication server may include additional logic, such as for registering individual components, managing operation of the server, replicating server data to other instances of the authentication server, etc.

The environment in which a present embodiment of the invention is executed may incorporate a general-purpose computer or a special-purpose device such as a hand-held computer. Details of such devices (e.g., processor, memory, data storage, display) may be omitted for the sake of clarity.

Data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), and other media capable of storing computer-readable media now known or later developed.

Methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of protecting [an organization's] network resources *of an organization*, comprising:

[maintaining, by an authentication server, a first root certificate of a first cryptographic infrastructure associated with a plurality of organizations;]

maintaining, *by an authentication server,* a [second] *first* root certificate of a [second] *first* cryptographic infrastructure associated with the organization, wherein the [second] *first* root certificate facilitates issuing other certificates associated with the organization to [the organization's] *a plurality of* authenticators *associated with the organization*;

issuing, to each of the [organization's] *plurality of* authenticators, an initial intermediate [CA] *certificate authority* (*CA*) certificate within the [second] *first* cryptographic infrastructure, wherein [a respective authenticator's] *each* intermediate CA certificate is signed by the [second] *first* root certificate, and wherein [the] *each* respective authenticator, *in the plurality of authenticators,* is configured to provision devices for the organization using [the corresponding] *an* intermediate CA certificate *corresponding to the respective authenticator*; [and responsive to the respective] *determining that a first* authenticator[issuing], *in the plurality of authenticators, issued a client certificate* to a new client computing device [a] *to provision the new client computing device, wherein the* client certificate [which] is signed by the [corresponding] initial intermediate CA certificate[,] *corresponding to the first authenticator; and*

*after the first authenticator provisions the new client computing device, and in response to determining that the first authenticator issued the client certificate to the new client computing device,* issuing[to the respective authenticator], *to the first authenticator,* a replacement intermediate CA certificate [which] *that* is signed by the [second] *first* root certificate, wherein the replacement intermediate CA certificate replaces the initial intermediate CA certificate.

2. The method of claim 1, further comprising:

*maintaining, by the authentication server, a second root certificate of a second cryptographic infrastructure associated with a plurality of organizations; and* issuing, to each *of one or more* client device [enabler] *enablers* configured to provision [a] client computing [device] *devices* within [the] *an* organization network *utilized by the organization*, an initial client certificate within the [first] *second* cryptographic infrastructure.

3. The method of claim 2, further comprising:

[after a given] *issuing, to a first* client device enabler [is operated to provision] *in the one or more client device enablers and based on determining that the first client device enabler provisioned* a *first* client computing device, [issuing] a replacement client certificate within the [first] *second* cryptographic infrastructure[to the given client device enabler].

4. The method of claim 2, further comprising:

recording identifiers of *the plurality of* authenticators and *the one or more* client device enablers authorized to operate in the organization network.

5. The method of claim 4, further comprising:

disseminating the recorded identifiers to all authenticators operating in the organization network.

6. The method of claim 1, further comprising:

recording identifiers of client computing devices authorized to access [the] *an* organization network *utilized by the organization*.

7. The method of claim 6, further comprising:

disseminating the recorded identifiers to all authenticators operating in the organization network.

8. The method of claim 7, wherein the identifiers comprise digital certificates issued to the client computing devices.

9. The method of claim 7, wherein the identifiers comprise fingerprints of digital certificates issued to the client computing devices.

10. The method of claim 1, wherein [an] *the first* authenticator is configured to:

authenticate a client device enabler[prior to provisioning of]*, wherein the client device enabler is configured to provision* a *first* client computing device[by the client device enabler].

11. The method of claim 10, wherein [an] *the first* authenticator is further configured to:

authenticate*, based on determining that the first client computing device has been provisioned,* the *first* client computing device[after said provisioning].

12. The method of claim [1] *2*, further comprising:

issuing*, to the plurality of authenticators,* server certificates within the [first] *second* cryptographic infrastructure[to all authenticators operating in the organization network].

13. A non-transitory computer-readable storage medium storing instructions that, when executed by a computer, cause the computer to perform a method of protecting [an organization's] network resources *of an organization*, the method comprising:

[maintaining, by an authentication server, a first root certificate of a first cryptographic infrastructure associated with a plurality of organizations;]

maintaining a [second] *first* root certificate of a [second] *first* cryptographic infrastructure associated with the organization, wherein the [second] *first* root certificate facilitates issuing other certificates associated with the organization to [the organization's] *a plurality of* authenticators *associated with the organization*;

issuing, to each of the [organization's] *plurality of* authenticators, an initial intermediate [CA] *certificate authority* (*CA*) certificate within the [second] *first* cryptographic infrastructure, wherein [a respective authenticator's] *each* intermediate CA certificate is signed by the [second] *first* root certificate, and wherein [the] *each* respective authenticator*, in the plurality of authenticators,* is configured to provision devices for the organization using [the corresponding] *an* intermediate CA certificate *corresponding to the respective authenticator*; [and responsive to the respective] *determining that a first* authenticator[issuing]*, in the plurality of authenticators, issued a client certificate* to a new client computing device [a] *to provision the new client computing device, wherein the* client certificate [which] is signed by the [corresponding] initial intermediate CA certificate[.] *corresponding to the first authenticator; and*

*after the first authenticator provisions the new client computing device, and in response to determining that the first authenticator issued the client certificate to the new client computing device,* issuing[to the respective authenticator]*, to the first authenticator,* a replacement intermediate CA certificate [which] *that* is signed by the [second] *first* root certificate, wherein the replacement intermediate CA certificate replaces the initial intermediate CA certificate.

14. The storage medium of claim 13, wherein the method further comprises:

*maintaining, by an authentication server, a second root certificate of a second cryptographic infrastructure associated with a plurality of organizations; and* issuing, to each *of one or more* client device [enabler] *enablers* configured to provision [a] client computing [device] *devices* within [the] *an* organization network *utilized by the organization*, an initial client certificate within the [first] *second* cryptographic infrastructure.

15. The storage medium of claim 14, wherein the method further comprises:

[after a given client device enabler is operated to provision a client computing device,] *first* issuing*, based on determining that a first client device enabler, in the one or more client device enablers, provisioned a first computing device and to the first client device enabler,* a replacement client certificate within the [first] *second* cryptographic infrastructure[to the given client device enabler].

16. The storage medium of claim 14, wherein the method further comprises:

recording identifiers of authenticators and client device enablers authorized to operate in the organization network.

17. The storage medium of claim 16, wherein the method further comprises:

disseminating the recorded identifiers to all authenticators operating in the organization network.

18. The storage medium of claim 13, wherein the method further comprises:

recording identifiers of client computing devices authorized to access [the] *an* organization network *utilized by the organization*.

19. The storage medium of claim 18, wherein the method further comprises:

disseminating the recorded identifiers to all authenticators operating in the organization network.

*20. The storage medium of claim 14, wherein the method further comprises:*

*issuing server certificates within the second cryptographic infrastructure to all authenticators operating in an organization network utilized by the organization.*

*21. A method comprising:*

*maintaining, by an authentication server, a first root certificate of a first cryptographic infrastructure associated with an organization, wherein the first root certificate facilitates issuing other certificates associated with the organization to a plurality of authenticators associated with the organization;*

*issuing, to an authenticator in the plurality of authenticators associated with the organization, an initial intermediate certificate authority (CA) certificate within the first cryptographic infrastructure and signed by the first root certificate, wherein the authenticator is configured to provision devices for the organization using the initial intermediate CA certificate;*

*receiving, based on the authenticator issuing, to a new client computing device, a new client certificate that is signed by the initial intermediate CA certificate to provision the new client computing device, a request for a replacement intermediate CA certificate; and*

*after the authenticator provisions the new client computing device, and in response to determining that the authenticator issued the new client certificate to the new client computing device, issuing, to the authenticator, a replacement intermediate CA certificate that is signed by the first root certificate, wherein the replacement intermediate CA certificate replaces the initial intermediate CA certificate.*

*22. The method of claim 21, further comprising:*

*maintaining, by the authentication server, a second root certificate of a second cryptographic infrastructure associated with a plurality of organizations.*

*23. The method of claim 22, further comprising:*

*issuing server certificates within the second cryptographic infrastructure to all authenticators operating in an organization network utilized by the organization.*

*24. The method of claim 22, further comprising:*

*issuing, to a client device enabler associated with the organization, an initial client certificate within the second cryptographic infrastructure, wherein the client device enabler is configured to provision client computing devices within the organization;*

*receiving, based on the client device enabler provisioning a first client computing device using the initial client certificate, a request for a replacement client certificate; and*

*issuing, based on the request for the replacement client certificate, the client device enabler a replacement client certificate within the second cryptographic infrastructure, wherein the replacement client certificate replaces the initial client certificate.*

*25. The method of claim 24, wherein the authenticator is configured to:*

*authenticate the client device enabler, wherein the client device enabler is configured to provision the first client computing device.*

*26. The method of claim 25, wherein the authenticator is further configured to:*

*authenticate, based on determining that the first client computing device has been provisioned, the first client computing device.*

*27. The method of claim 24, further comprising:*

*recording identifiers of a plurality of authenticators and a plurality of client device enablers authorized to operate in an organization network utilized by the organization.*

*28. The method of claim 27, further comprising:*

*disseminating the recorded identifiers to the plurality of authenticators operating in the organization network.*

*29. The method of claim 24, wherein the client device enabler is a removable storage medium.*

*30. The method of claim 21, further comprising:*

*recording identifiers of a plurality of client computing devices authorized to access an organization network utilized by the organization.*

*31. The method of claim 30, further comprising:*

*disseminating the recorded identifiers to a plurality of authenticators operating in the organization network.*

*32. The method of claim 30, wherein the identifiers comprise digital certificates issued to individual client computing devices of the plurality of client computing devices.*

*33. The method of claim 30, wherein the identifiers comprise fingerprints of digital certificates issued to individual client computing devices of the plurality of client computing devices.*

*34. The method of claim 21, wherein each of the plurality of authenticators is issued an initial intermediate CA certificate within the first cryptographic infrastructure.*

*35. The method of claim 21, wherein the initial intermediate CA certificate has a limited number of uses.*

*36. The method of claim 21, further comprising:*

*maintaining a whitelist of valid intermediate CA certificates associated with each authenticator within an organization network utilized by the organization.*

*37. The method of claim 36, further comprising:*

*updating the whitelist to include the replacement intermediate CA certificate.*

*38. The method of claim 36, further comprising:*

*removing one or more intermediate CA certificates associated with the authenticator based on determining that the authenticator has been compromised.*

*39. The method of claim 21, wherein the authenticator is an access point in an organization network utilized by the organization.*

*40. The method of claim 21, wherein the replacement intermediate CA certificate comprises an updated counter value different from a counter value of the initial intermediate CA certificate.*

*41. A method comprising:*

*receiving, by an authenticator, an initial intermediate certificate authority (CA) certificate within a first cryptographic infrastructure associated with an organization, wherein the initial intermediate CA certificate is signed by a first root certificate within the first cryptographic infrastructure, wherein the first root certificate facilitates issuing other certificates associated with the organization to a plurality of authenticators associated with the organization, and wherein the authenticator is configured to provision, using the initial intermediate CA certificate, devices for the organization;*

*issuing a new client certificate to a client computing device to provision the client computing device, wherein the new client certificate is signed by the initial intermediate CA certificate;*

*after provisioning the client computing device, and in response to issuing the new client certificate to the client computing device, sending, to an authentication server that maintains the first root certificate, a request for a replacement intermediate CA certificate; and*

*receiving, based on the request, a replacement intermediate CA certificate that is signed by the first root certificate, wherein the replacement intermediate CA certificate replaces the initial intermediate CA certificate.*

*42. The method of claim 41, further comprising:*

*receiving, by the authenticator, a server certificate within a second cryptographic infrastructure, wherein the server certificate is signed by a second root certificate maintained by the authentication server.*

*43. The method of claim 42, further comprising:*

*authenticating, by the authenticator, a client device enabler operating on an organization network utilized by the organization, wherein the client device enabler is configured to provision the client computing device.*

*44. The method of claim 43, wherein the authenticator authenticates the client device enabler using one or more certificates issued within the second cryptographic infrastructure.*

*45. The method of claim 43, wherein the authenticator authenticates the client computing device after the client computing device has been provisioned by the client device enabler.*

*46. The method of claim 42, further comprising:*

*receiving a whitelist comprising identifiers associated with a plurality of authenticators operating in an organization network utilized by the organization.*

*47. The method of claim 42, further comprising:*

*receiving a whitelist comprising identifiers associated with a plurality of client computing devices operating in an organization network utilized by the organization.*

*48. The method of claim 42, further comprising:*

*receiving a whitelist comprising identifiers associated with a plurality of client device enablers operating in an organization network utilized by the organization.*

*49. The method of claim 41, wherein the initial intermediate CA certificate has a limited number of uses.*

*50. The method of claim 41, wherein the authenticator is an access point in an organization network utilized by the organization.*

*51. A method comprising:*

*maintaining, by an authentication server, a first root certificate of a first cryptographic infrastructure associated with a plurality of organizations, wherein the first root certificate facilitates issuing other certificates associated with the plurality of organizations to a plurality of authenticators associated with the plurality of organizations;*

*issuing, to a client device enabler associated with an organization of the plurality of organizations, an initial client certificate within the first cryptographic infrastructure, wherein the initial client certificate is signed by the first root certificate, and wherein the client device enabler is configured to provision client computing devices within an organization network utilized by the organization;*

*determining that an authenticator of the organization authenticated the client device enabler after provisioning, by the client device enabler and using the initial client certificate, of a first client computing device; and*

*after the client device enabler provisions the first client computing device, and in response to determining that the client device enabler used the initial client certificate to provision the first client computing device, receiving, from the client device enabler, a request for a replacement client certificate; and*

*issuing, to the client device enabler and based on the request, a replacement client certificate signed by the first root certificate, wherein the replacement client certificate replaces the initial client certificate.*

*52. The method of claim 51, wherein the client device enabler has a limited number of allowed uses.*

*53. The method of claim 52, further comprising:*

*tracking, by the authentication server, a number of uses of the client device enabler; and*

*adding the client device enabler to a blacklist based on determining that the tracked number of uses exceeds the limited number of allowed uses.*

*54. The method of claim 51, wherein the client device enabler is configured to provision the first client computing device by configuring a network connection and security parameters of the first client computing device.*

*55. The method of claim 51, wherein the client device enabler is a removable storage medium.*

*56. A method comprising:*

*receiving, by a client device enabler associated with an organization, an initial client certificate within a first cryptographic infrastructure, wherein the initial client certificate is signed by a first root certificate within the first cryptographic infrastructure, and wherein the first root certificate facilitates issuing other certificates associated with the organization;*

*provisioning, using the initial client certificate, a client computing device within an organization network utilized by the organization;*

*after the client device enabler provisions the client computing device, and in response to determining that the client device enabler used the initial client certificate to provision the client computing device, sending, to an authentication server, a request for a replacement client certificate; and*

*receiving, based on the request, a replacement client certificate that is signed by the first root certificate, wherein the replacement client certificate replaces the initial client certificate.*

*57. The method of claim 56, further comprising:*

*receiving, based on sending the request for the replacement client certificate, a request for authentication; and*

*authenticating, by the client device enabler, using the initial client certificate.*

*58. The method of claim 56, wherein the client device enabler has a limited number of allowed uses.*

*59. The method of claim 56, wherein the client device enabler is a removable storage medium.*

*60. The method of claim 56, wherein the client device enabler is configured to provision the client computing device by configuring a network connection and security parameters of the client computing device.*

* * * * *